(12) United States Patent
Lee (10) Patent No.: US 9,395,770 B1
(45) Date of Patent: Jul. 19, 2016

(54) RETRACTABLE DATA AND POWER SYSTEM HAVING AN INNER CARRIAGE SIDE PANEL WITH A LATCH WITH A ROUND SLOT AND AN ANGLED SLOT

(71) Applicant: Yuyi Lee, La Palma, CA (US)

(72) Inventor: Yuyi Lee, La Palma, CA (US)

( * ) Notice: Subject to any disclaimer, the term of this patent is extended or adjusted under 35 U.S.C. 154(b) by 0 days.

(21) Appl. No.: 14/838,007

(22) Filed: Aug. 27, 2015

(51) Int. Cl.
*H01R 13/60* (2006.01)
*G06F 1/18* (2006.01)
*G06F 1/16* (2006.01)
*H01R 13/639* (2006.01)

(52) U.S. Cl.
CPC .............. *G06F 1/189* (2013.01); *G06F 1/1613* (2013.01); *H01R 13/6397* (2013.01)

(58) Field of Classification Search
CPC ...... H01R 13/60; H01R 13/44; H01R 13/447; H01R 13/6397
USPC .......................................... 439/131, 133–135
See application file for complete search history.

(56) References Cited

U.S. PATENT DOCUMENTS

| | | | | |
|---|---|---|---|---|
| 5,575,668 A * | 11/1996 | Timmerman | .......... | A47B 21/06 174/482 |
| 6,803,525 B1 * | 10/2004 | Liao | ....................... | H02G 11/02 174/117 F |
| 6,942,502 B2 * | 9/2005 | Sharples | ................. | H01R 13/44 174/480 |
| 6,984,140 B2 * | 1/2006 | Juret | ....................... | G06K 13/08 439/153 |
| 7,605,330 B1 * | 10/2009 | Black | ..................... | H02G 3/185 174/53 |
| 8,157,578 B2 * | 4/2012 | Lee | ......................... | H01R 27/00 439/172 |
| 8,192,211 B1 * | 6/2012 | Huang | ................. | H01R 13/447 439/131 |
| 8,851,909 B2 * | 10/2014 | Shammoh | ............ | H01R 25/006 439/134 |
| 2002/0127897 A1 * | 9/2002 | Sharples | .............. | H01R 13/447 439/131 |

* cited by examiner

*Primary Examiner* — Chandrika Prasad
(74) *Attorney, Agent, or Firm* — John D. Tran; Rhema Law Group (57) ABSTRACT

An apparatus and method can include: providing an inner carriage side panel having a pivot point; coupling a latch to the inner carriage side panel, the latch having a round slot, an angled slot, a round bottom, a first extension, and a second extension; coupling an outer carriage side panel to the pivot point of the inner carriage side panel the outer carriage side panel including a latching pin extending therefrom, the latching pin positioned to sit in the round slot based on the inner carriage side panel being in a closed configuration, and the latching pin positioned to fit within the angled slot based on the inner carriage side panel transitioning to an open configuration; and attaching a carriage bottom panel to the inner carriage side panel.

10 Claims, 7 Drawing Sheets

RETRACTABLE DATA AND POWER SYSTEM HAVING AN INNER CARRIAGE SIDE PANEL WITH A LATCH WITH A ROUND SLOT AND AN ANGLED SLOT

TECHNICAL FIELD

This disclosure relates to retractable communication and power centers, more particularly to latching mechanisms and receptacle housing mechanisms for communication and power centers.

BACKGROUND

The rapidly growing market for portable electronic devices, e.g. cellular phones, laptop computers, and personal digital assistants (PDAs), is an integral facet of modern life. Powering and connecting the multitude of portable devices represents one of the largest potential market opportunities for next generation retractable communication and power centers. Retractable communication and power centers have unique attributes that have significant impacts on manufacturing, in that they must be structurally robust, and rich in functionality.

Retractable communication and power centers must also be produced in high volumes at relatively low cost. Manufacturing and designing retractable communication and power centers is at the very core of next generation communication and power center insertion strategies outlined in road maps for development of next generation products.

There have been many approaches to addressing the advanced design and manufacturing requirements of retractable communication and power centers with successive generations of retractable communication and power centers. The limitations and issues with current communication and power centers include increasing longevity, durability, latching strength, and manufacturing costs.

One common problem with prior approaches to the retractable communication and power centers was deterioration and mechanical failure of the latch. When mechanical failure of the latch occurred, the retractable communication and power centers remains in an open position which defeats many of the main benefits of a retractable communication and power center.

These previous approaches also resulted in weaker latching capability which leads to poor reliability and performance. Manufactures were forced into a tradeoff between a mechanical failure to latch or to open all the way during the life of the final product.

When the manufactures chose to use weaker springs, the ability of the communication and power centers to open fully would commonly fail resulting in communication and power centers opening only halfway during the life of the final product. Alternatively, when the manufactures chose to use a stronger spring the latch would often fail and the communication and power centers could not be locked in the closed position.

In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Thus, a need remains for a data and power system with improved longevity, durability, latching strength, and manufacturing costs. Solutions to these problems have been long sought but prior developments have not taught or suggested any solutions and, thus, solutions to these problems have long eluded those skilled in the art.

SUMMARY

A data and power system and method, providing significantly improved longevity, durability, latching strength, and manufacturing costs, are disclosed. The data and power system and method can include: providing an inner carriage side panel having a pivot point; coupling a latch to the inner carriage side panel, the latch having a round slot, an angled slot, a round bottom, a first extension, and a second extension; coupling an outer carriage side panel to the pivot point of the inner carriage side panel the outer carriage side panel including a latching pin extending therefrom, the latching pin positioned to sit in the round slot based on the inner carriage side panel being in a closed configuration, and the latching pin positioned to fit within the angled slot based on the inner carriage side panel transitioning to an open configuration; and attaching a carriage bottom panel to the inner carriage side panel.

Other contemplated embodiments can include objects, features, aspects, and advantages in addition to or in place of those mentioned above. These objects, features, aspects, and advantages of the embodiments will become more apparent from the following detailed description, along with the accompanying drawings.

BRIEF DESCRIPTION OF THE DRAWINGS

The data and power system is illustrated in the figures of the accompanying drawings which are meant to be exemplary and not limiting, in which like reference numerals are intended to refer to like components, and in which.

DETAILED DESCRIPTION

In the following description, reference is made to the accompanying drawings that form a part hereof, and in which are shown by way of illustration, embodiments in which the data and power system may be practiced. It is to be understood that other embodiments may be utilized and structural changes may be made without departing from the scope of the data and power system.

When features, aspects, or embodiments of the data and power system are described in terms of steps of a process, an operation, a control flow, or a flow chart, it is to be understood that the steps can be combined, performed in a different order, deleted, or include additional steps without departing from the data and power system as described herein.

The data and power system is described in sufficient detail to enable those skilled in the art to make and use the data and power system and provide numerous specific details to give a thorough understanding of the data and power system; however, it will be apparent that the data and power system may be practiced without these specific details.

In order to avoid obscuring the data and power system, some well-known system configurations are not disclosed in detail. Likewise, the drawings showing embodiments of the system are semi-diagrammatic and not to scale and, particularly, some of the dimensions are for the clarity of presentation and are shown greatly exaggerated in the drawing FIGs. Generally, the data and power system can be operated in any orientation.

As used herein, the term system is defined as a device or method depending on the context in which it is used. For expository purposes, the term "horizontal" as used herein is defined as a plane parallel to the top plane or surface of the frame, regardless of its orientation. The term "vertical" refers to a direction perpendicular to the horizontal as just defined. Terms, such as "above", "below", "bottom", "top", "side", "higher", "lower", "upper", "over", and "under", are defined with respect to the horizontal plane. The term "coupled" or "coupling" is used herein to refer to a physical connection.

Figure 1:
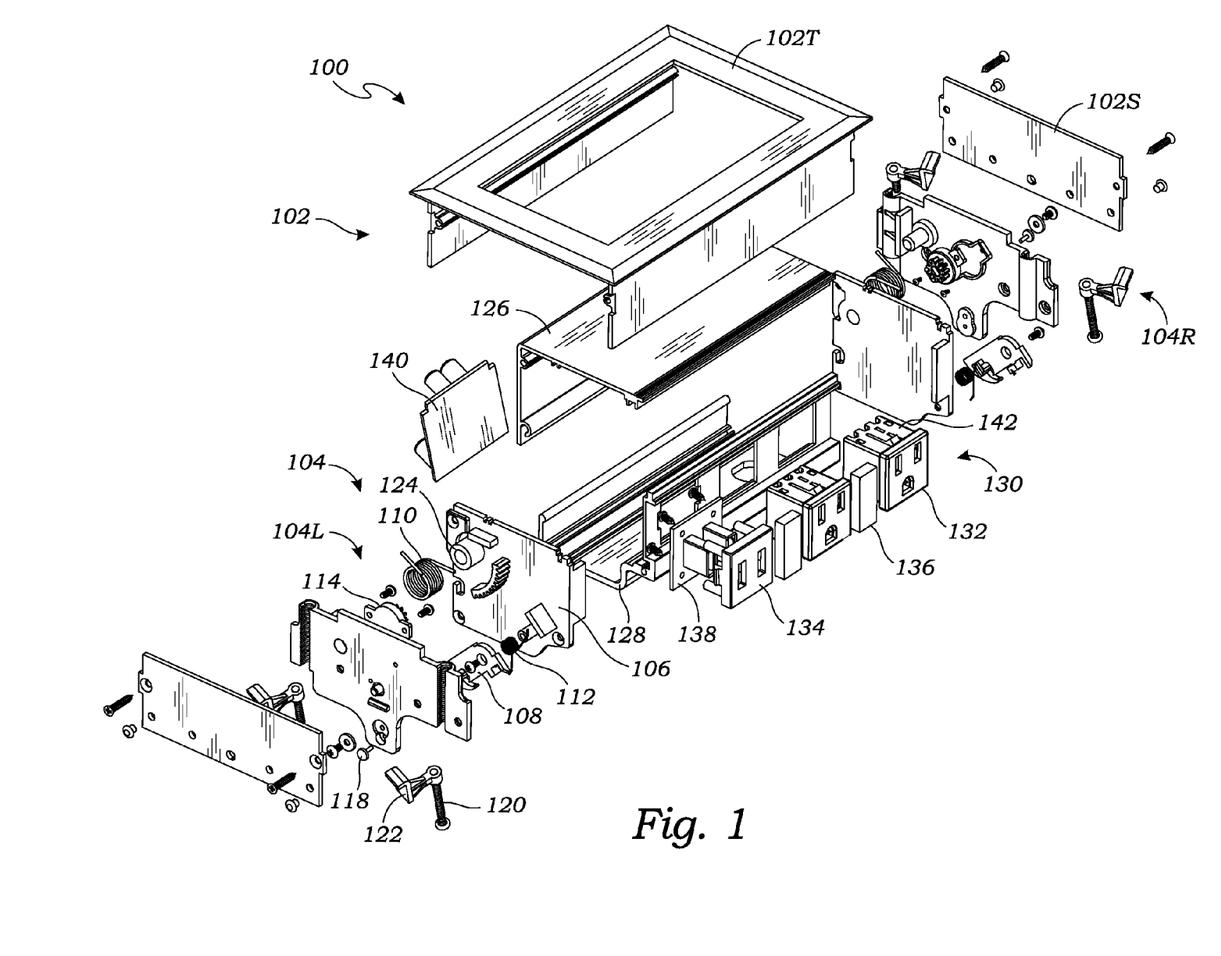
FIG. 1 is an exploded isometric view of the data and power system.

Referring now to FIG. 1, therein is shown an exploded isometric view of the data and power system 100. The data and power system 100 is shown having a frame 102. The frame 102 can include a frame top 102T and frame sides 102S that will contain latching mechanisms 104 such as a left latching mechanism 104L and a right latching mechanism 104R.

The latching mechanisms 104 can include an inner carriage side panel 106, a latch 108, a carriage spring 110, a latch spring 112, a damper 114, and an outer carriage side panel 116. The latch 108, the carriage spring 110, the damper 114, and the latch spring 112 can be mounted between the inner carriage side panel 106 and the outer carriage side panel 116.

The outer carriage side panel 116 can include a latching pin 118 extending therethrough. The inner carriage side panel 106 of the latching mechanisms 104 can move relative to the outer carriage side panel 116 as the latch 108 interacts with the latching pin 118 as described below in FIGS. 12 and 13.

The outer carriage side panel 116 can be attached to the frame sides 102S. The frame sides 102S can be anchored to a surface such as a desk or table top with mounting bolts 120 and mounting clips 122. The outer carriage side panel 116 can be stationary with respect to the frame sides 102S while the inner carriage side panel 106 can rotate about a pivot point 124.

The pivot point 124 can extend from the inner carriage side panel 106 to the outer carriage side panel 116. The carriage spring 110 can fit around the pivot point 124 and be captured between the inner carriage side panel 106 and the outer carriage side panel 116.

Figure 10:
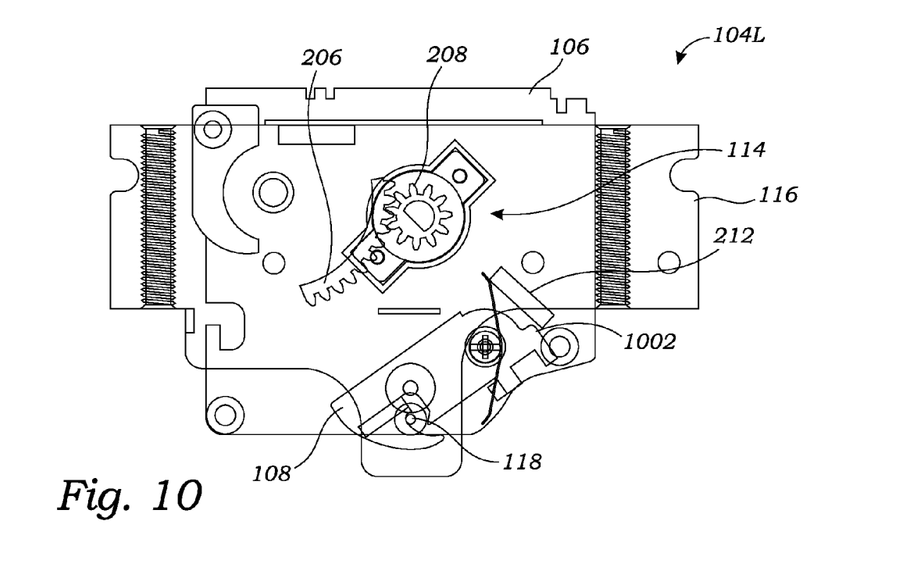
FIG. 10 is a see-through side view of the left latching mechanism of FIG. 1 in a closed configuration.
Figure 11:
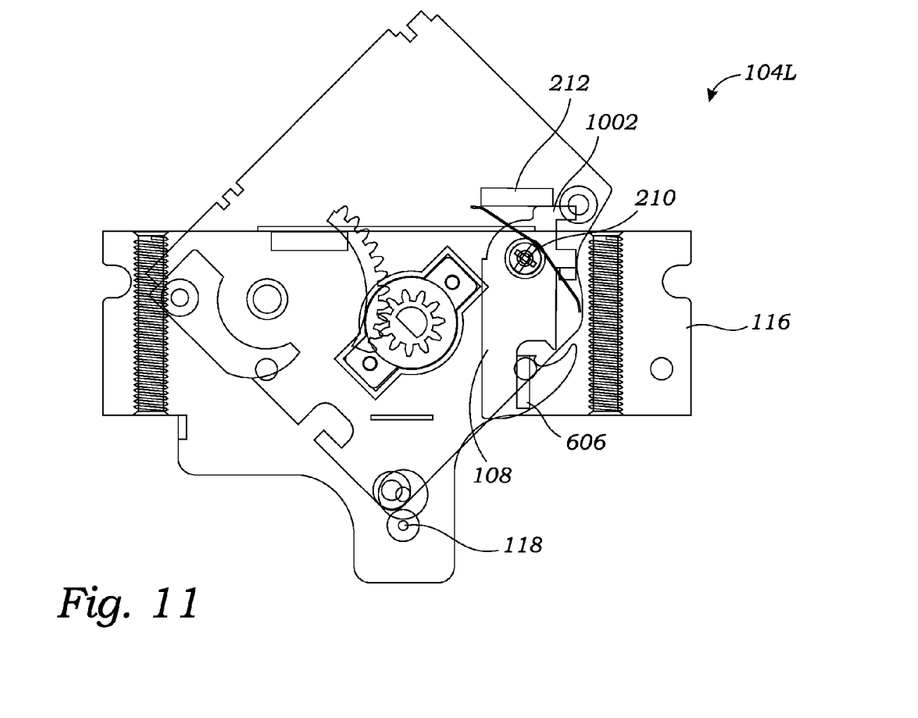
FIG. 11 is a see-through side view of the left latching mechanism of FIG. 1 in an open configuration.

The carriage spring 110 can provide force for the inner carriage side panel 106 to rotate into an open configuration as depicted in FIG. 11. It is contemplated that a user would supply an external force to overcome the force of the carriage spring 110 in order to move the inner carriage side panel 106 from the open configuration of FIG. 11 to the closed configuration of FIG. 10.

The latch spring 112 can be coupled to the latch 108 and provide the force required for the latch 108 to move relative to the latching pin 118. It has been discovered that implementing the latch 108 with the latching pin 118 and the latch spring 112 together with the carriage spring 110 overcomes the tradeoff of previous attempts to provide a robust long lasting solution for communication and power centers in that the carriage spring 110 can be configured to provide sufficient amount of opening force to ensure the inner carriage side panel 106 can continuously open fully while the latch spring 112 can be configured to provide enough latching force based on the interplay of the latching pin 118 and the latch 108 to ensure that once latched, the inner carriage side panel 106 stays closed.

The inner carriage side panel 106 can be coupled to a carriage top panel 126 and a carriage bottom panel 128. The carriage bottom panel 128 can be attached to the carriage top panel 126.

The carriage bottom panel 128 can provide a mounting surface for ports 130 including alternating current outlets 132 and universal serial bus ports 134. Other contemplated ports include ethernet ports, telephone ports, and high-definition multimedia interface ports.

Between the alternating current outlets 132 and the universal serial bus ports 134, spacers 136 can be mounted. It is contemplated that the ports 130 can include embedded surge protectors, which adds protection to the risk of most power surges which could damage connected devices.

The universal serial bus ports 134 can be coupled to a universal serial bus charger output assembly 138 and a universal serial bus charger assembly 140. The ports 130 can include snaps 142 enabling the ports 130 to snap into the carriage bottom panel 128 from the front rather than assembling a carriage with ports by sliding them in through a side.

It has been discovered that implementing the ports 130 with the snaps 142 enabling the ports to be snapped into the carriage bottom panel 128 from the front greatly enhances the functionality and versatility of the data and power system 100 by enabling the data and power system 100 to be configured for a specific task or reconfigured without full disassembly when the ports 130 for new technology becomes available or desirable.

The ports 130, the carriage bottom panel 128, and the top carriage panel 126 can rotate with the inner carriage side panel 106 as the inner carriage side panel 106 rotates from the closed configuration of FIG. 10 to the open configuration of FIG. 11. The ports 130 can be retracted and hidden while in the closed configuration and exposed for use when in the open configuration.

The frame top 102T can cover the outer portions of the latching mechanisms 104 to provide a clean appearance to the data and power system 100. The inner carriage side panel 106 along with the ports 130, the carriage bottom panel 128, and the top carriage panel 126 can rotate to partially extend out from the frame top 102T while in the open configuration.

When in the closed configuration, only the carriage top panel 126 can be seen within the frame top 102T.

Figure 2:
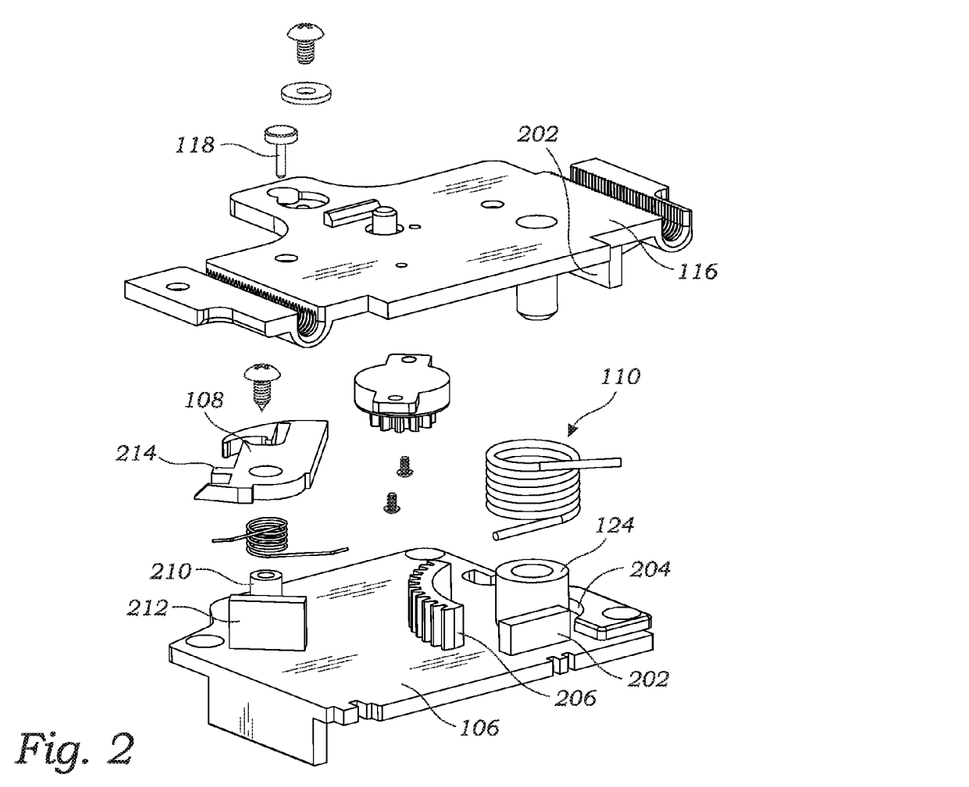
FIG. 2 is an exploded isometric view of the left latching mechanism of FIG. 1.

Referring now to FIG. 2, therein is shown an exploded isometric view of the left latching mechanism 104L of FIG. 1. The left latching mechanism 104L is shown having the inner carriage side panel 106 and the outer carriage side panel 116 facing one another.

The inner carriage side panel 106 is depicted having the pivot point 124 with the carriage spring 110 positioned there over for mounting on the pivot point 124. The pivot point 124 is shown on the inner carriage side panel 106.

The pivot point 124 can be formed as a rod on the outer carriage side panel 116, which can fit into or be mated to a hole on the inner carriage side panel 106. Near the pivot point 124 on the inner carriage side panel 106 and the pivot point 124 on the outer carriage side panel 116 are spring stops 202.

The spring stops 202 can maintain tension of the carriage spring 110 when the carriage spring 110 is mounted around the pivot point 124 and mounted between the inner carriage side panel 106 and the outer carriage side panel 116. Near the pivot point 124 on the inner carriage side panel 106, the inner carriage side panel 106 includes a spring race 204. The spring race 204 can stabilize the carriage spring 110 as it flexes between the open configuration of FIG. 11 and the closed configuration of FIG. 10.

The spring race 204 can be a guide for the carriage spring 110 as the inner carriage side panel 106 moves relative to the outer carriage side panel 116. The inner carriage side panel 106 is shown having a fixed damper gear 206 configured in an arch partially around the pivot point 124.

The fixed damper gear 206 can be moveably engaged with a rotatable damper gear 208 on the damper 114. It is contemplated that the damper 114 can be an inertia rotary damper. The damper 114 can dampen rotary motion on the rotatable damper gear 208 induced from the fixed damper gear 206 moves the rotatable damper gear 208 as the inner carriage side panel 106 opens or closes.

The damper 114 can be anchored to the outer carriage side panel 116 with only the rotatable damper gear 208 able to move. Between the inner carriage side panel 106 and the outer carriage side panel 116, the latch 108 is shown positioned above a latch pivot 210 and a latch spring backstop 212.

The latch 108 is depicted having a latch spring anchor 214. The latch spring 112 can be mounted around the latch pivot 210 and bounded by the latch spring backstop 212 of the inner carriage side panel 106 and anchored by the latch spring anchor 214 of the latch 108.

As is described in greater detail below in FIGS. 12 and 13, the latch spring 112 can apply a force to the latch 108 biasing the latch 108 with a rotational bias about the latch pivot 210. Specifically, the latch spring 112 exerts a rotational force that biases a bottom portion of the latch 108 to rotate out away from the fixed damper gear 206 of the inner carriage side panel 106 while a top portion of the latch 108 is biased to rotate in toward the fixed damper gear 206 of the inner carriage side panel 106.

The latching pin 118 is depicted as aligned with a bottom portion of the latch 108. The latch 108 and the latching pin 118 can work together with the movement of the inner carriage side panel 106 relative to the outer carriage side panel 116 to maintain the inner carriage side panel 106 in an open configuration or closed configuration.

Figure 3:
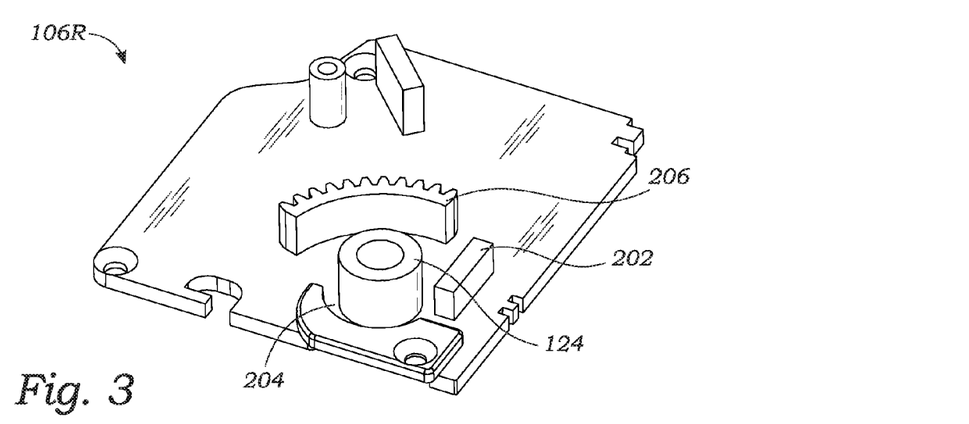
FIG. 3 is an isometric view of the inner carriage side panel from the right latching mechanism of FIG. 1.

Referring now to FIG. 3, therein is shown an isometric view of the inner carriage side panel 106 from the right latching mechanism 104R of FIG. 1. The inner carriage side panel 106 is shown having the pivot point 124 surrounded by the spring stops 202, the spring race 204, and the fixed damper gear 206.

At an opposite corner of the inner carriage side panel 106 from the pivot point 124, the inner carriage side panel 106 is depicted having the latch spring backstop 212 next to the latch pivot 210. It can be noted that the inner carriage side panel 106 of the left latching mechanism 104L of FIG. 1 and the inner carriage side panel 106 of the right latching mechanism 104R can be mirror images of each other in the placement of the components as just described.

Figure 4:
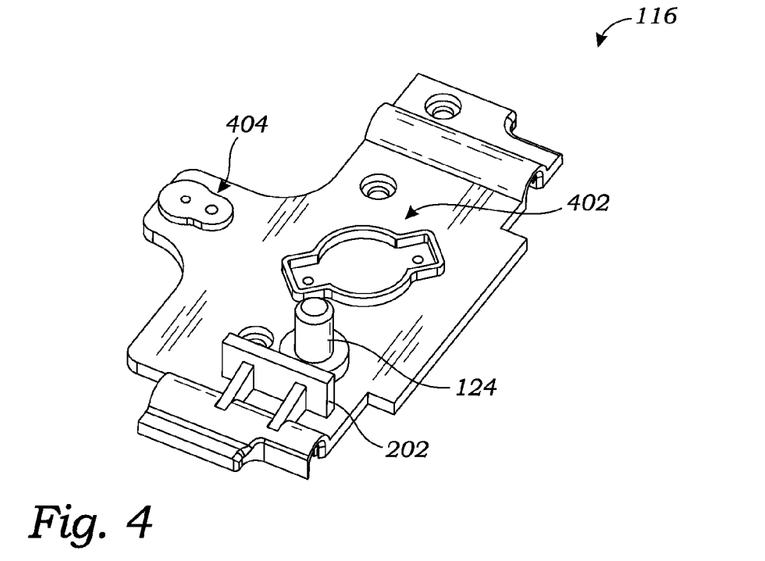
FIG. 4 is an isometric view of the outer carriage side panel from the left latching mechanism of FIG. 1.

Referring now to FIG. 4, therein is shown an isometric view of the outer carriage side panel 116 from the left latching mechanism 104L of FIG. 1. The outer carriage side panel 116 is shown having the pivot point 124 surrounded by the spring stops 202.

The outer carriage side panel 116 is shown also having a damper mount 402 for mounting and aligning the damper 114 of FIG. 1. The outer carriage side panel 116 is further shown having a latching pin mount 404. The latching pin mount 404 can secure, align, and stabilize the latching pin 118 of FIG. 1.

Figure 5:
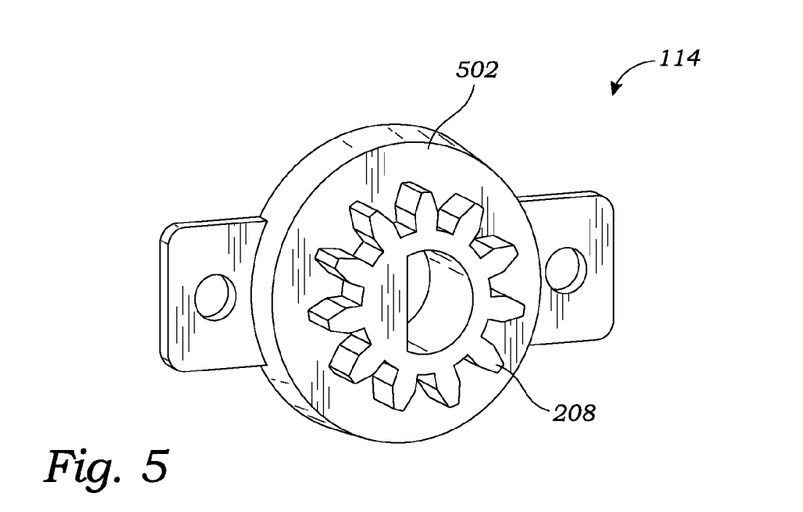
FIG. 5 is an isometric view of the damper from the left latching mechanism of FIG. 1.

Referring now to FIG. 5, therein is shown an isometric view of the damper 114 from the left latching mechanism 104L of FIG. 1. The damper 114 is depicted having the rotatable damper gear 208 affixed to a damper body 502.

Figure 6:
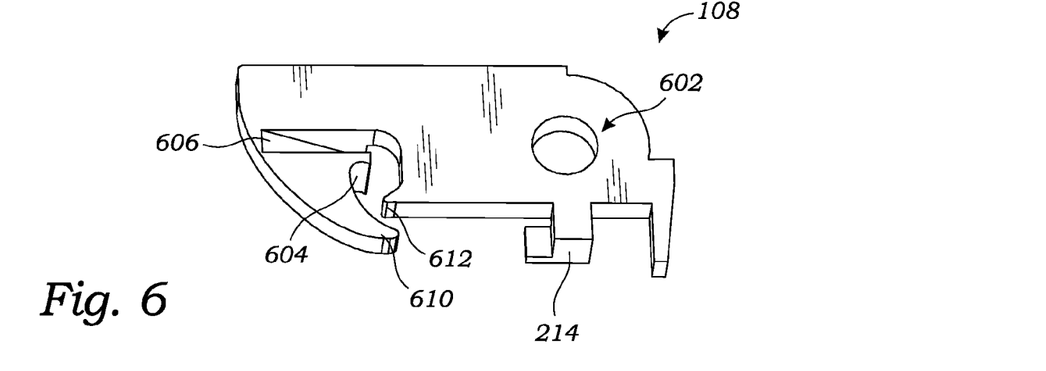
FIG. 6 is an isometric front view of the latch from the left latching mechanism of FIG. 1.

Referring now to FIG. 6, therein is shown an isometric front view of the latch 108 from the left latching mechanism 104L of FIG. 1. The latch 108 is depicted having a hole 602. The hole 602 can mount the latch 108 around the latch pivot 210 of FIG. 2.

The latch 108 is further shown having the latch spring anchor 214 near the hole 602. On an opposite side of the latch 108 from the hole 602, the latch 108 is shown to have a round slot 604, an angled slot 606, and a round bottom 608.

The round slot 604 can terminate with the round bottom 608 in a first extension 610. The angled slot 606 can be longitudinally aligned with the length of the latch 108 and angled from a back side near the round slot 604 extending toward a front side near the round bottom 608. A second extension 612 can be seen behind the first extension 610 nearer to the round slot 604 than the first extension 610.

Figure 7:
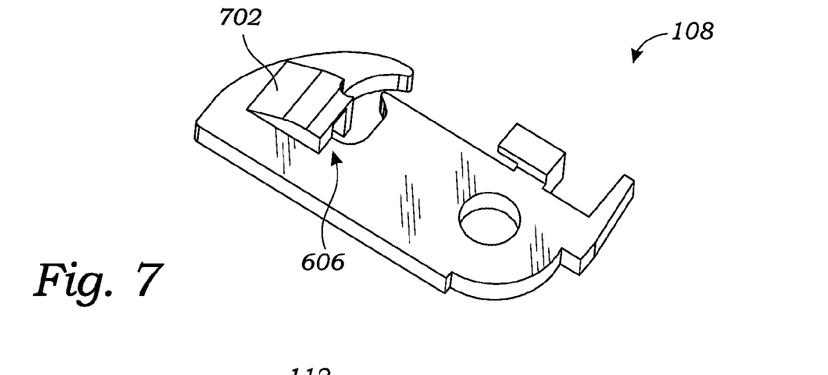
FIG. 7 is an isometric back view of the latch from the left latching mechanism of FIG. 1.

Referring now to FIG. 7, therein is shown an isometric back view of the latch 108 from the left latching mechanism 104L of FIG. 1. The latch 108 is shown having the angled slot 606 supported by an angled slot extension 702.

The angled slot extension 702 extends the angled slot 606 from behind the latch 108 to the front of the latch 108. The angled slot extension 702 can also for a portion and border the round slot 604.

Figure 8:
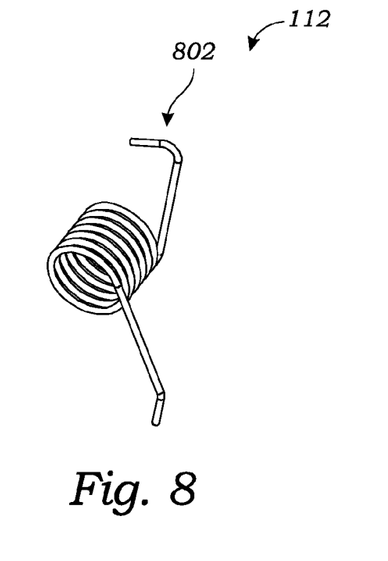
FIG. 8 is an isometric front view of the latch spring from the left latching mechanism of FIG. 1.

Referring now to FIG. 8, therein is shown an isometric front view of the latch spring 112 from the left latching mechanism 104L of FIG. 1. The latch spring 112 can include bends 802 at each end of the latch spring 112 for interfacing with the latch spring backstop 212 of FIG. 2 and the latch spring anchor 214 of FIG. 2.

Figure 9:
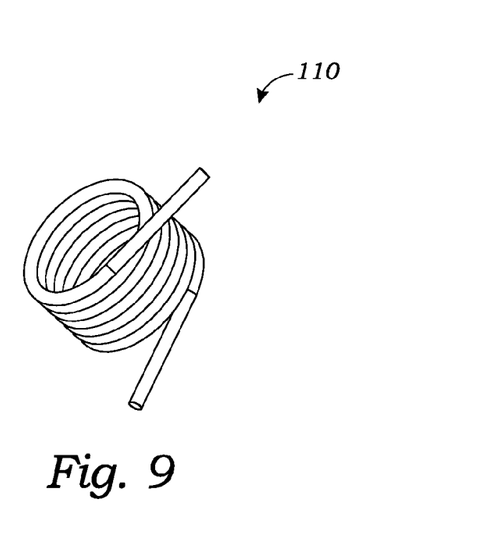
FIG. 9 is an isometric front view of the carriage spring from the left latching mechanism of FIG. 1.

Referring now to FIG. 9, therein is shown an isometric front view of the carriage spring 110 from the left latching mechanism 104L of FIG. 1. The carriage spring 110 is shown in greater detail. Unlike the latch spring 112 of FIG. 8, the carriage spring 110 is depicted without the bends 802 of FIG. 8.

Referring now to FIG. 10, therein is shown a see-through side view of the left latching mechanism 104L of FIG. 1 in a closed configuration. The outer carriage side panel 116 is depicted having the latching pin 118 extending therethrough and interacting with the latch 108.

It can be seen that when the inner carriage side panel 106 is in the closed configuration, the latching pin 118 is positioned within the round slot 604 of the latch 108. The latch 108 is shown not contacting the latch spring backstop 212 with a latch stop 1002. The damper 114 is depicted having the rotatable damper gear 208 engaged with the fixed damper gear 206.

Referring now to FIG. 11, therein is shown a see-through side view of the left latching mechanism 104L of FIG. 1 in an open configuration. The outer carriage side panel 116 is depicted having the latching pin 118 extending therethrough and after sliding through the angled slot 606 of the latch 108.

It can be seen that when the inner carriage side panel 106 is in the open configuration, the latching pin 118 is positioned away from and under the latch 108. The latch stop 1002 of the latch 108 is shown in direct contact with the latch spring backstop 212 inhibiting the latch 108 from moving further in the counter-clockwise direction about the latch pivot 210.

Figure 12:
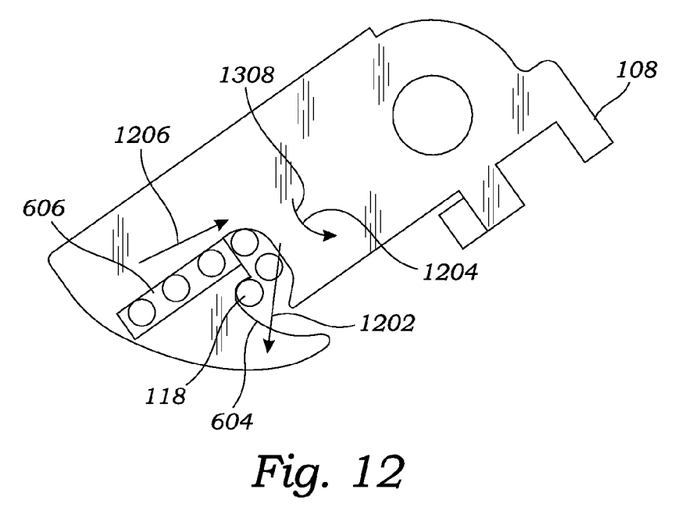
FIG. 12 is a side view of the relative position between the latching pin and the latch from the left latching mechanism of FIG. 1 when releasing the latch.
Figure 13:
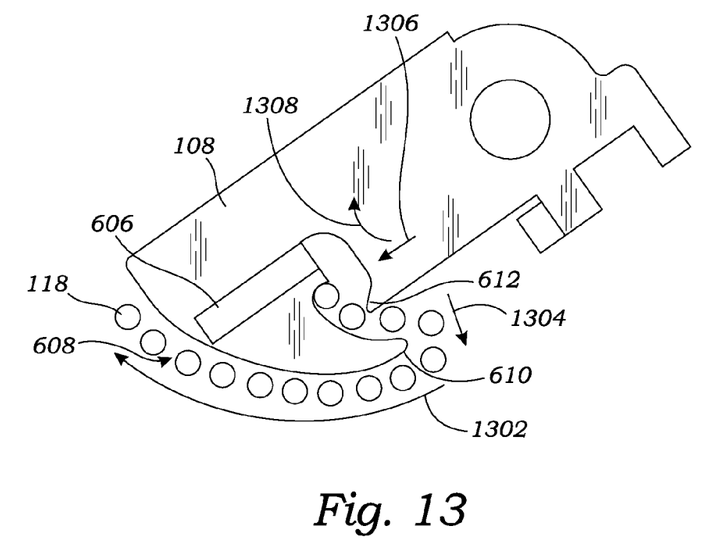
FIG. 13 is a side view of the relative position between the latching pin and the latch from the left latching mechanism of FIG. 1 when engaging the latch.

In regard to FIGS. 12 and 13, these FIGs. depict the latch 108 and the latching pin 118. It is to be understood that in the embodiment depicted by FIGS. 12 and 13, the latching pin 118 is stationary while the latch 108 moves relative to the latching pin 118. The latching pin 118 is depicted at multiple different locations relative to the latch 108 and those having ordinary skill in the art would understand the depiction of the latching pin 118 in various places is a depiction of the relative location only even though it is in a fixed position.

Referring now to FIG. 12, therein is shown a side view of the relative position between the latching pin 118 and the latch 108 from the left latching mechanism 104L of FIG. 1 when releasing the latch 108. The releasing mechanism of the latch 108 enabling the inner carriage side panel 106 of FIG. 1 to open includes three motions of the latch 108.

A first motion 1202 is a downward motion of the latch 108 that dislodges the latching pin 118 from the round slot 604. After the first motion 1202 the latching pin 118 no longer restrains the latch 108 from rotating due to the force applied by the latch spring 112 of FIG. 1. The first motion 1202 is induced by an external downward force applied by a user.

A second motion 1204 rotates the latch 108 about the latch pivot 210 of FIG. 2. As the latch 108 rotates under the second motion 1204, the latching pin 118 moves back from the round slot 604 near the angled slot 606. The second motion 1204 is induced by force supplied by the latch spring 112.

A third motion 1206 moves the latch 108 upward. The third motion 1206 is induced by the force applied by the carriage spring 110 of FIG. 1 forcing the inner carriage side panel 106 to rotate about the pivot point 124 of FIG. 1. During the third motion 1206 the latching pin 118 can be seen moving from the top of the angled slot 606 down through the angled slot 606 and exiting the angled slot 606 to no longer contact the latch 108 as the latch 108 continues to move upward away from the latching pin 118.

Referring now to FIG. 13, therein is shown a side view of the relative position between the latching pin 118 and the latch 108 from the left latching mechanism 104L of FIG. 1 when engaging the latch 108. The engaging mechanism of the latch 108 enabling the inner carriage side panel 106 of FIG. 1 to latch closed includes four motions of the latch 108.

A first motion 1302 is a rotational motion of the latch 108. As the round bottom 608 of the latch 108 engages the latching pin 118, the latch 108 is forced to rotate in the first motion 1302 overcoming the force supplied by the latch spring 112 of FIG. 1 in the other direction. The first motion 1302 is a result of an external downward force supplied by a user to the inner carriage side panel 106. During the first motion 1302, the latch 108 will rotate so and the latching pin 118 will initially be near the angled slot 606 and end when the latching pin 118 is near the first extension 610.

Once the latching pin 118 is past the first extension 610 the latch 108 will make a second motion 1304 toward the latching pin 118 until the second extension 612 of the latch 108 contacts the latching pin 118. The second motion 1304 is induced by the force supplied by the latch spring 112.

When the latching pin 118 stops the latch 108 from further movement an audible click can be heard and indicate to a use to stop applying the external downward force to the inner carriage side panel 106. When the external force is removed from the inner carriage side panel 106, the inner carriage side panel 106 will rotate slightly up due to the force supplied by the carriage spring 110 of FIG. 1. The slight upward movement in the inner carriage side panel 106 will provide a third movement 1306 that pulls the latch 108 upward slightly until the latching pin 118 no longer contacts the second extension 612.

When the latching pin 118 no longer contacts the second extension 612 after the third motion 1306, the latch 108 will rotate counter-clockwise in a fourth motion 1308 until the latching pin 118 is seated in the round slot 604. Once the latching pin 118 is seated in the round slot 604, the inner carriage side panel 106 is latched closed.

Figure 14:
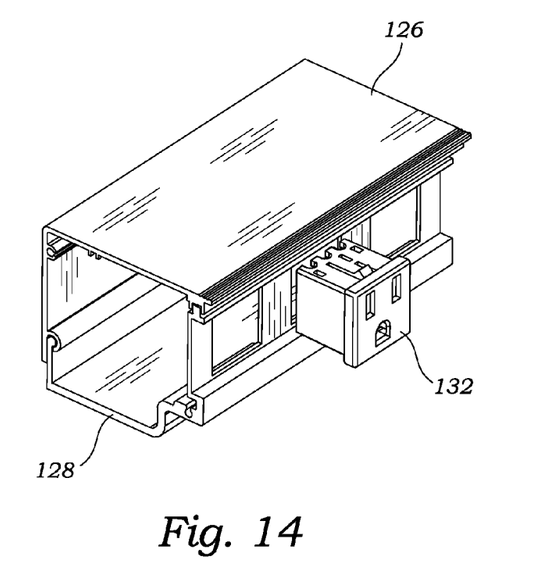
FIG. 14 is an exploded isometric view of the carriage panels of FIG. 1.

Referring now to FIG. 14, therein is shown an exploded isometric view of the carriage panels of FIG. 1. The carriage bottom panel 128 is depicted affixed to the carriage top panel 126 with one of the ports 130 positioned so as to be inserted and in direct contact with the carriage bottom panel 128. The port 130 is depicted as the alternating current outlet 132.

Figure 15:
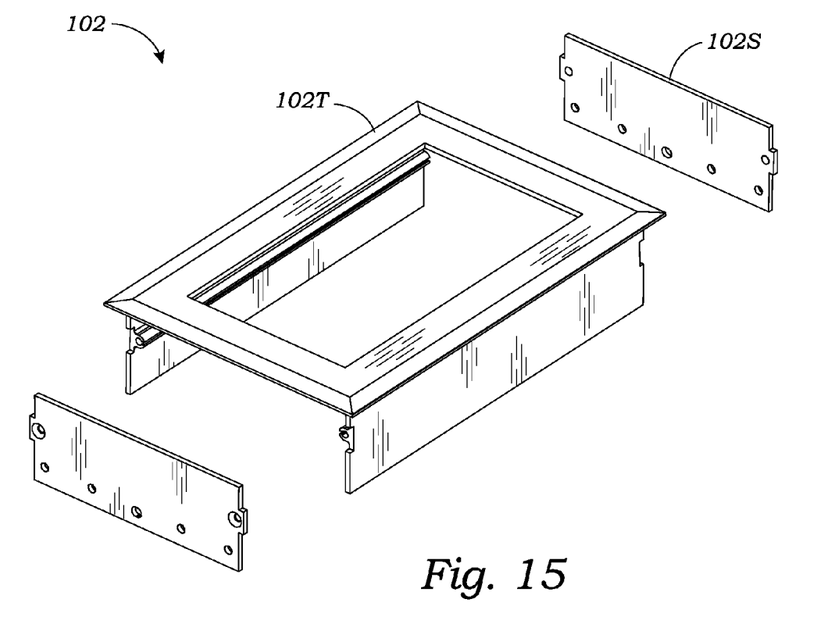
FIG. 15 is an exploded isometric view of the carriage frame of FIG. 1.

Referring now to FIG. 15, therein is shown an exploded isometric view of the carriage frame 102 of FIG. 1. The frame top 102T is shown positioned with the frame sides 102S on either side. The frame 102 can provide a clean package for inserting the data and power system 100 within a surface.

Thus, it has been discovered that the data and power system furnishes important and heretofore unknown and unavailable solutions, capabilities, and functional aspects. The resulting configurations are straightforward, cost-effective, uncomplicated, highly versatile, accurate, sensitive, and effective, and can be implemented by adapting known components for ready, efficient, and economical manufacturing, application, and utilization.

While the data and power system has been described in conjunction with a specific best mode, it is to be understood that many alternatives, modifications, and variations will be apparent to those skilled in the art in light of the preceding description. Accordingly, it is intended to embrace all such alternatives, modifications, and variations, which fall within the scope of the included claims. All matters set forth herein or shown in the accompanying drawings are to be interpreted in an illustrative and non-limiting sense.

What is claimed is:

1. A retractable data and power system comprising:
   an inner carriage side panel having a pivot point;
   a latch coupled to the inner carriage side panel, the latch having a round slot, an angled slot, a round bottom, a first extension, and a second extension;
   an outer carriage side panel coupled to the pivot point of the inner carriage side panel the outer carriage side panel including a latching pin extending therefrom, the latching pin positioned to sit in the round slot based on the inner carriage side panel being in a closed configuration, and the latching pin positioned to fit within the angled slot based on the inner carriage side panel transitioning to an open configuration; and a carriage bottom panel attached to the inner carriage side panel.

2. The system of claim 1 further comprising a port connected to the carriage bottom panel by sliding the port through a front of the carriage bottom panel.

3. The system of claim 2 wherein the port is an alternating current outlet, a universal serial bus port, an ethernet port, a telephone port, a high-definition multimedia interface port, or a combination thereof.

4. The system of claim 1 further comprising a carriage spring coupled to the inner carriage side panel, the carriage spring positioned to exert a force to rotate the inner carriage side panel into the open configuration.

5. The system of claim 1 further comprising a rotational damper coupled to the outer carriage side panel positioned to damp motion of the inner carriage side panel.

6. The system of claim 1 further comprising:
a latch spring coupled to the latch positioned to exert a force to rotate the latch toward the first extension; and
a frame coupled to the outer carriage side panel.

7. The system of claim 6 wherein the latching pin is positioned to contact the round bottom based on the inner carriage side panel being moved into the closed configuration.

8. The system of claim 6 wherein the latching pin is positioned within the angled slot based on the inner carriage side panel being moved into the open configuration.

9. The system of claim 6 wherein the angled slot forms a boarder of the round slot.

10. The system of claim 6 wherein the outer carriage side panel including the latching pin extending therefrom includes the outer carriage side panel including the latching pin extending therethrough.

\* \* \* \* \*